United States Patent [19]
Albrecht et al.

[11] 3,949,550
[45] Apr. 13, 1976

[54] ENGINE EXHAUST FLOW DIVERTER

[75] Inventors: Harry A. Albrecht, Hobe Sound; Michael Diver, North Palm Beach; Norman F. Fowle, North Palm Beach; Edwin E. Knight, North Palm Beach, all of Fla.

[73] Assignee: United Technologies Corporation, Hartford, Conn.

[22] Filed: Mar. 5, 1975

[21] Appl. No.: 555,647

[52] U.S. Cl............................... 60/229; 239/265.27
[51] Int. Cl.² .......................................... F02K 1/20
[58] Field of Search ......... 60/229, 226, 226 A, 232; 239/265.25, 265.27, 265.31

[56] References Cited
UNITED STATES PATENTS

| | | | |
|---|---|---|---|
| 2,510,506 | 6/1950 | Lindhagen | 239/265.27 X |
| 2,865,169 | 12/1958 | Hausmann | 239/265.27 |
| 3,266,243 | 8/1966 | Thomas | 60/229 |
| 3,455,111 | 7/1969 | Allcock | 60/232 X |

FOREIGN PATENTS OR APPLICATIONS

| | | | |
|---|---|---|---|
| 723,160 | 2/1955 | United Kingdom | 239/265.27 |

*Primary Examiner*—Clarence R. Gordon
*Attorney, Agent, or Firm*—Jack N. McCarthy

[57] ABSTRACT

The engine exhaust flow diverter is formed as a duct, extending from the exhaust section of a gas turbine powerplant, having a closed end which is contoured externally as a nozzle plug. First exit means for the flow from the powerplant extends around the duct just forwardly of the contoured plug and second exit means for the flow extends around the duct midway between the first exit means and the end of the exhaust section of the powerplant. An annular door is axially movable around the duct between an open and closed position to control the flow through the second exit opening and an annular shroud is axially movable around the duct between an open and closed position to control the flow through the second exit means. The annular shroud cooperates with the contoured nozzle plug to form a conventional nozzle. An actuating system is connected to both the annular door and annular shroud to actuate them so that when one is open the other is closed. Means insure that each door or shroud is sealed when it is in its closed position. A bellcrank lever device is connected to the annular shroud so that its movement can be varied with respect to the movement of the annular door, this is done to control the respective areas of the openings as they move between their open and closed positions to maintain a desired effective area for optimum engine operation.

9 Claims, 5 Drawing Figures

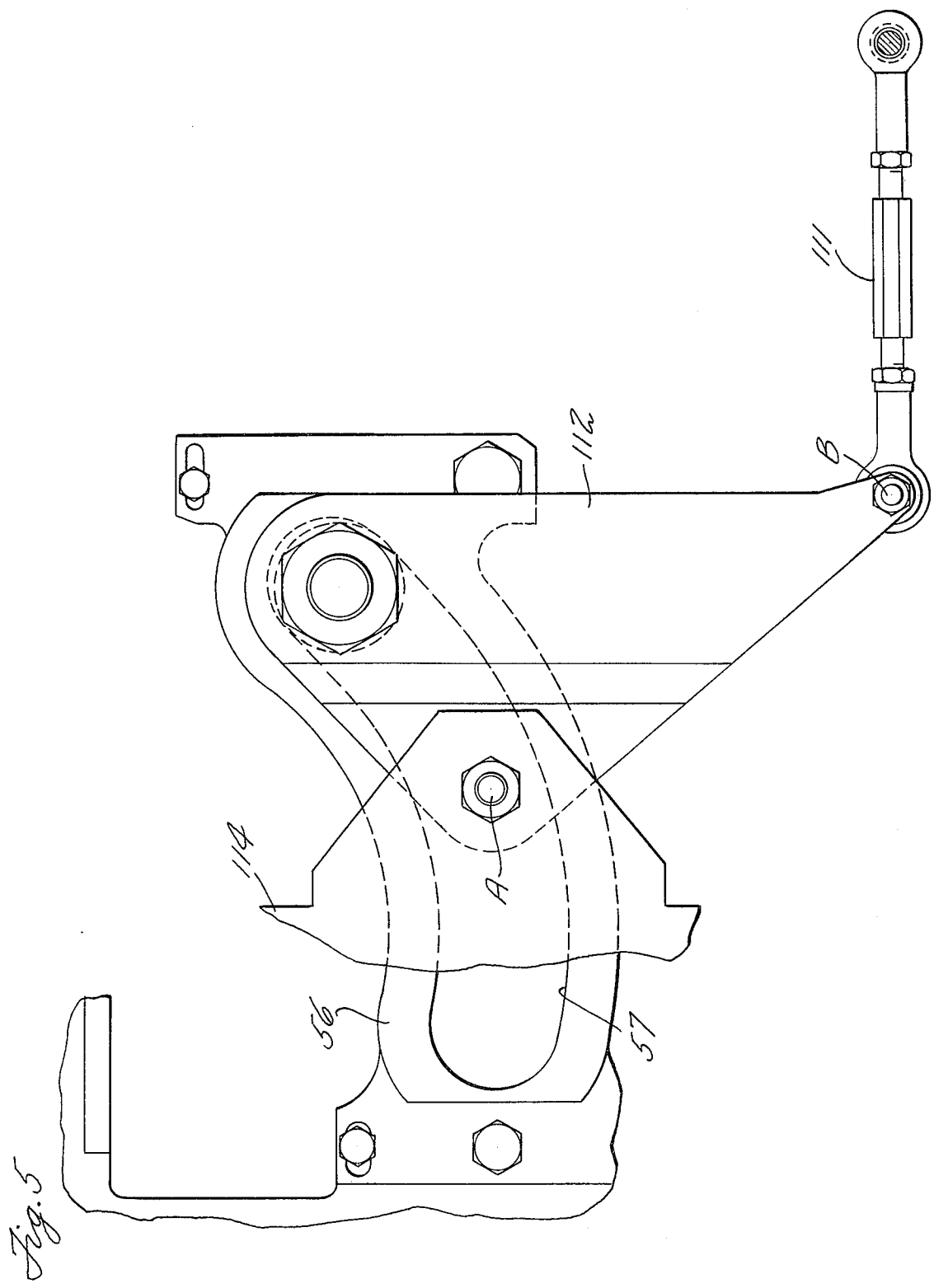

ENGINE EXHAUST FLOW DIVERTER

The invention herein described was made in the course of or under a contract or subcontract with the Department of the Navy.

BACKGROUND OF THE INVENTION

This invention relates to the use of a device to control the exhaust flow from an engine so that it can be used to control flight providing for horizontal flight and vertical flight. While many devices are known for thrust reversal and thrust vectoring, no one device could be found such as applicant has disclosed.

SUMMARY OF THE INVENTION

A primary object of the present invention is to provide an engine exhaust flow diverter that operates conventionally for horizontal flight and diverts all of the engine exhaust into a specially constructed manifold for vertical flight.

In accordance with the present invention, a duct is provided for receiving engine exhaust, said duct having a closed end and two exits whereby one exit is placed in an open position while the other is placed in a closed position.

A further object of this invention is to provide an annular diverter door for axial movement over one exit and an annular nozzle shroud for axial movement over the other exit.

A further object of this invention is to provide an actuating mechanism which will axially slide an annular diverter door to its closed position while placing an annular nozzle shroud in its open position and will also provide for placing the annular nozzle shroud in a closed position while sliding the annular diverter door to an open position.

A further object of this invention is to provide an actuating mechanism which will provide for efficient operation of the annular door and annular nozzle shroud.

BRIEF DESCRIPTION OF THE DRAWINGS

FIG. 5 is a view taken along the line 5—5 of FIG. 4 showing the relationship of the bellcrank, synchronization ring, and cam track.

DESCRIPTION OF THE PREFERRED EMBODIMENT

Figure 1:
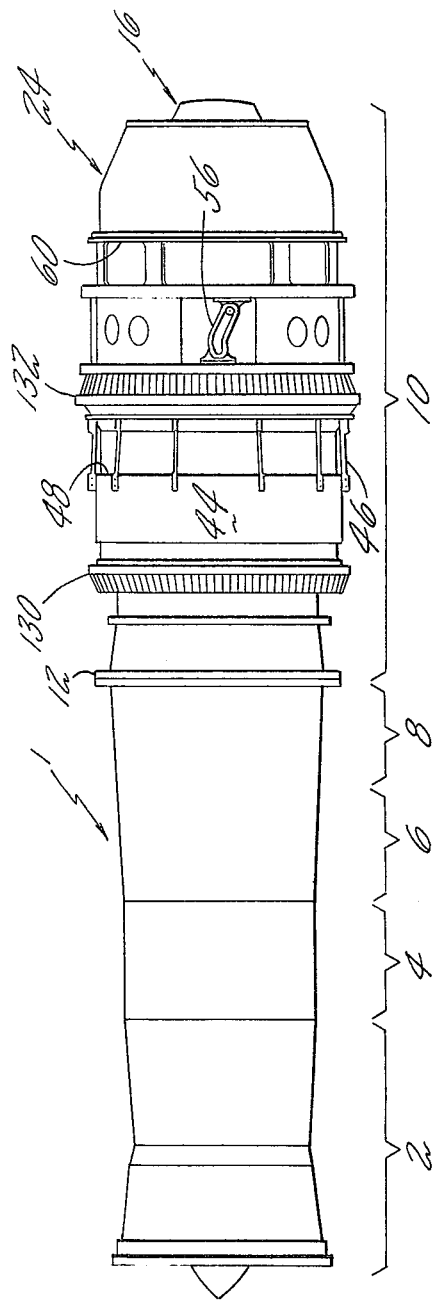
FIG. 1 is a representative showing of an aircraft gas turbine engine having an engine flow diverter connected thereto.
Figure 4:
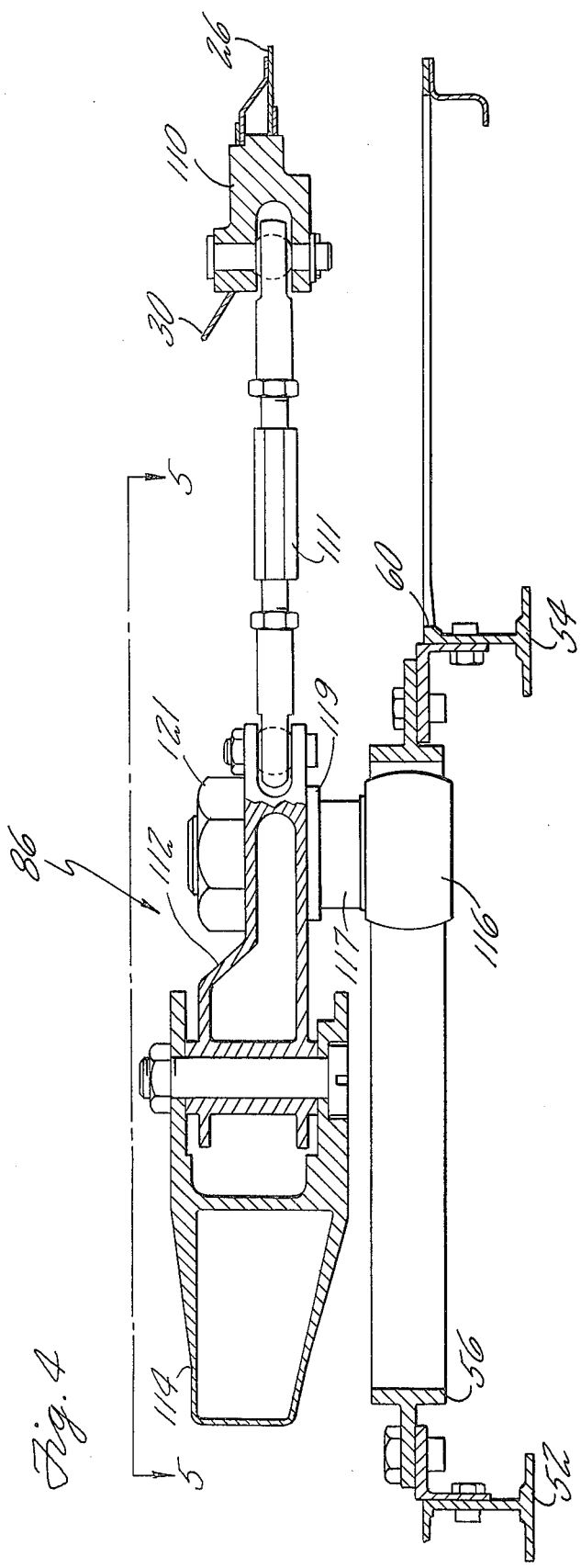
FIG. 4 is a sectional view taken through the flow diverter showing the cam actuating means.
Figure 2:
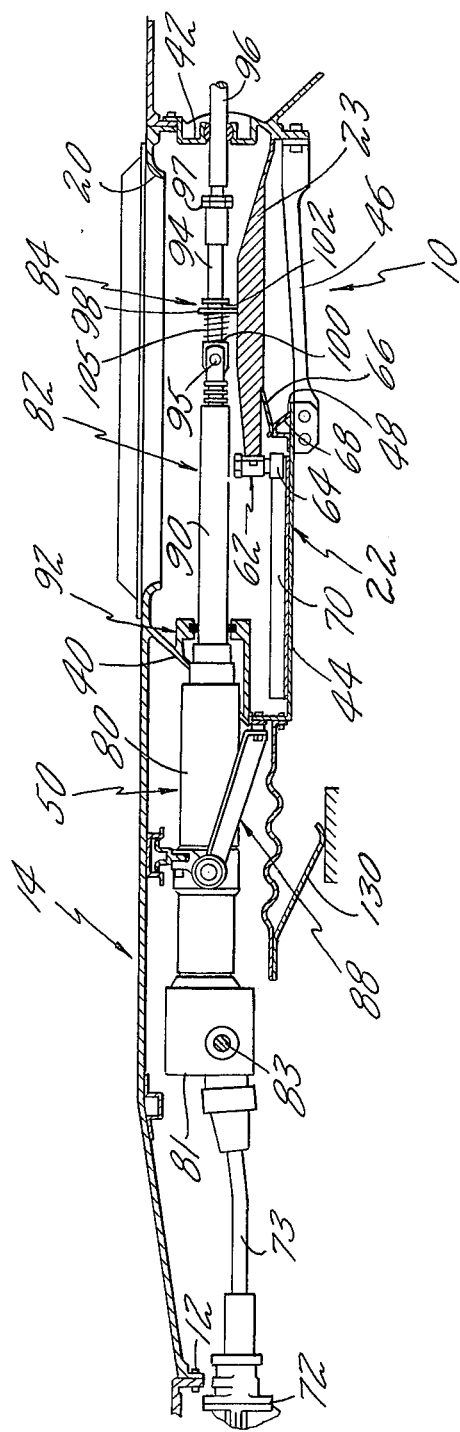
FIG. 2 is a sectional view of the front half of the engine exhaust flow diverter.
Figure 3:
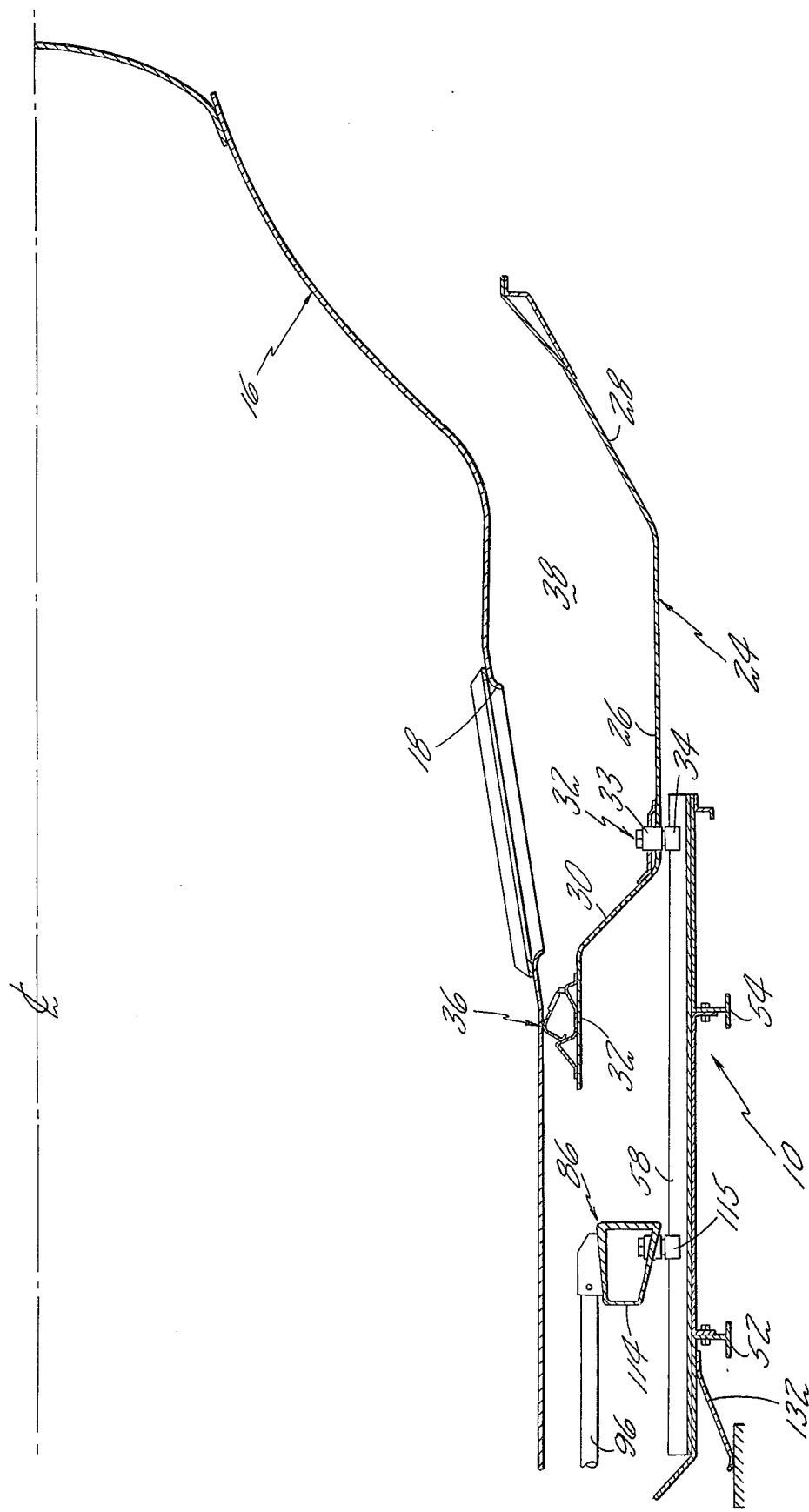
FIG. 3 is a sectional view of the rear half of the engine exhaust flow diverter.

Referring to FIG. 1, a gas turbine powerplant 1 is shown. The powerplant has a compressor section 2, a combustion section 4, a turbine section 6, an exhaust section 8, and an engine exhaust flow diverter 10. The engine exhaust flow diverter 10 is connected to the engine by the flange means 12. FIGS. 2 and 3 together show a longitudinal section through the flow diverter 10 showing the different flow passages through which the engine exhaust can flow.

The flow diverter 10 includes a duct 14 which extends rearwardly from the flange means 12 to receive flow from the exhaust section 8 and has a closed end contoured externally as a nozzle plug 16. Opening means 18 extends around the duct 14 just forwardly of the contoured plug 16 to provide a first exit means from duct 14, and opening means 20 extends around the duct 14 substantially midway between the opening means 18 and flange means 12 to provide a second exit means from duct 14. A fixed outer casing 22 extends around said duct 14 from a point just forwardly of opening means 20 to a point radially outwardly from opening means 18 to support actuating means 50 and axial movement of annular diverter door 23 and annular nozzle shroud 24.

The fixed outer casing 22 is fixed at its forward end to an annular flange member 40 which extends outwardly from the duct 14 at a point just forwardly of the opening means 20. The outer casing 22 is also fixedly connected to the duct 14 by an annular flange member 42 which extends inwardly from the fixed outer casing 22 at a point just rearwardly of the opening means 20. The annular flange member 40 and the annular flange member 42 form part of the flow passage for the exhaust which passes outwardly from opening means 20 during operation of the flow diverter 10, this action will be hereinafter described.

The outer casing 22 is formed between its forward edge where it is fixed to annular flange member 40 and the point where annular flange member 42 extends inwardly therefrom, with its forward half as a solid annular casing 44 and with its rearward section consisting of tie bars 46 extending between the rearward edge of the solid casing to the outer edge of the annular member 42 forming an annular opening 48. The remainder of the fixed outer casing 22 extends as a cantilevered cylindrical section to its rearwardmost point radially outwardly from opening means 18. The forward part of this cylindrical section is formed having two spaced circular T-shaped beams 52 and 54. These beams support cam tracks 56 and nozzle shroud guide tracks 58 to be hereinafter described. Lightening holes 60 are located in the cylindrical section to reduce the weight of the flow diverter 10.

The annular diverter door 23 moves between a rearward closed position shown in FIG. 2 and forward open position. A plurality of roller means 62 have bosses fixed around the forward part of the annular diverter door with rollers 64 rotatably mounted on radially extending shafts for a purpose to be hereinafter described. In one construction five rollers were used. The rear edge of the annular diverter door 23 is formed as a flat thin edge to have sealing engagement with a flat surface on the annular member 42. An annular sealing member 66 is located around the outer rear surface of the annular diverter door 23 for engagement with an annular ring 68 located on the rearward inner surface of annular casing 44 when the diverter door 23 is in its rearward closed position. Guide tracks 70 for rollers 64 are located along the inner surface of the annular casing 44.

The annular nozzle shroud 24 is mounted for axial movement between duct 14 and the cantilevered cylindrical section of the fixed outer casing 22. The annular nozzle shroud 24 comprises a cylindrical section 26 having an inwardly tapering section 28 at the rear end thereof. The forward end of cylindrical section 26 has an inwardly tapering section 30 connecting it to a short circular section 32 spaced from the duct 14. The annular nozzle shroud 24 moves between a rearward open position, shown in FIG. 3, and a forward closed position. A plurality of roller means 32 have bosses 33 fixed around the forward part of the cylindrical section 26 with rollers 34 rotatably mounted on radially extending shafts. Each of the rollers 34 ride in a U-shaped nozzle shroud guide track 58 which extends for the length of the cantilevered cylindrical section of casing 22. In one construction, eight rollers were used. A fluid seal means 36 is mounted between the cylindrical section 32 and the outer surface of the duct 14 forward of opening means 18. A seal of this type is shown in U.S. Pat. No. 3,354,649. This prevents the exhaust in the annular duct 38 formed between the annular nozzle shroud 24 and the rear part of the duct 14 and contoured plug 16 from leaking forwardly between the annular nozzle shroud 24 and duct 14 when the annular nozzle shroud 24 is in its forward closed position.

As it can be seen, the flow diverter 10 has two exit opening means 18 and 20 with flow through opening means 18 being controlled by the annular nozzle shroud 24 and the flow through opening means 20 being controlled by the annular diverter door 23. When flow is permitted through opening means 18, it is directed through annular duct 38 for horizontal or conventional flight and with no flow being permitted through opening means 20 and when flow is permitted through opening means 20, it is directed through annular opening 48 for use with lift devices for vertical operation and with no flow being permitted through opening means 18. Manifolds can collect the flow from the annular opening 48 and direct it to wing or canard lift devices.

Actuating means 50 provides the proper cooperating actuation for the annular nozzle shroud 24 and the annular diverter door 23. This actuating means 50 comprises three main parts, (1) a plurality of ball screw actuators 80, (2) actuating rod means 82, (3) connecting means 84 to annular diverter door 23 and (4) connecting means 86 to annular nozzle shroud 24.

Each ball screw actuator 80 is mounted by bracket means 88 extending between the duct 14 and the front of outer casing 22 where the annular flange member 40 is connected. Each ball screw actuator 80 extends through an opening in the annular flange member 40 with its translating actuating rod 90 extending through a cylindrical seal means 92 into the space between the annular flange 40 and annular flange 42. A gear box 81 is connected to each ball screw actuator for rotating it and in turn translating the actuating rod 90 for its required distance of travel. All of the gear boxes 81 are interconnected by a drive linkage 83 so that they move together.

An air motor 72 is connected to one of the gear boxes 81 by a drive means 73 providing the rotary input for all of the gear boxes 81. The air motor 72 is connected by a mechanical linkage to the aircraft cockpit so that the pilot can request actuation between the two modes of flow, that is (1) flow through opening means 18 into the annular nozzle shroud and over the contoured nozzle plug 16 for horizontal or conventional flight and (2) flow through opening means 20 and out annular opening 48 to lift devices for vertical operation.

It is noted that while the tracks 70 and seal means 92 are both shown in FIG. 2 as being approximately in the same plane, this has been done to show the operation of the actuating means 50 and the annular diverter door.

The tracks 70 and roller means 62 are located around the circumference of the flow diverter 10 so as to be located between the seal means 92, to permit the annular diverter door 23 to move forward for its full distance.

The free end of each actuating rod 90 extends to a point in its rearward position which is just short of the center of the annular diverter door 23 in its closed rearward position (see FIG. 2). A short shaft 94 is connected to each free end of an actuating rod 90 by a pin 95 for conveying the movement of the actuating rod 90 to control the annular diverter door 23. A rod extension 96 is connected to the rear end of each short shaft 94 at 97 for conveying the movement of the actuating rod 90 to the annular nozzle shroud 24. Each of these rod extensions 96 pass through a sealing means in the annular member 42. This sealing means can be contoured as a ball joint to aid in alignment of the rod extension 96.

As part of the connecting means 84, the annular diverter door 23 has an inwardly extending flange 98 for each ball screw actuator 80 and it has an opening therein through which extension 94 passes. The flange 98 extends inwardly from the annular diverter door 23 at approximately the midpoint of the door and it is positioned between two fixed abutment surfaces on the extension 94, annular surface 100 and annular surface 102. Surface 100 is on the enlarged end of the shaft 94 and surface 102 is on a flange on the shaft 94. These surfaces provide for retraction of the annular diverter door 23 and for positive closing thereof. A spring 105 is located around each shaft 94 between its surface 100 and cooperating flange 98. It can be seen that as the actuating rods 90 move to their forward position, which places the door 23 in its full open position, the surfaces 102 engage the flanges 98 to provide for the actuation. Then, as the actuating rods 90 move rearwardly together to position the annular diverter door 23 in its rearward closed position, they act through the springs 105, positioned between the surface 100 and adjacent side of flange 98, to move the diverter door 23 to its closed position. When the rear end of the door meets the flange 42, the actuating rod 90 continues to move the short shaft 94 to the right so that a positive engagement of the rear end of the diverter door 23, with the mating face of flange 42, is assured by the compressed action of springs 105 acting on flanges 98. The sealing member 66 also engages the ring 68 at this time, preventing flow through opening means 20.

As part of the connecting means 86, the annular nozzle shroud 24 includes a plurality of bosses 110 which are connected by a plurality of tie rods 111 to a plurality of bellcranks 112. The bellcranks are in turn connected to a synchronization ring 114 which is in turn connected to the free ends of the rod extensions 96. Rollers 115 are fixed in bosses around the outer periphery of the synchronization ring 114 to engage the guide tracks 58 at their forward end. These rollers provide for stability in axial movement and prevent the synchronization ring 114 from rotating. The tie rods 111 are adjustable in length to properly position the annular nozzle shroud 24 with the actuating means 50. The fulcrum of each bellcrank 112 has a cam roller 116 which rides in a cam track 56 to produce the desired movement between the end pivotally connected to the synchronization ring 114 at A and the end pivotally connected to the tie rod 111 at B. It can be seen that each bellcrank 112 not only pivots about its fulcrum but has a movable fulcrum which follows a predetermined contoured cam track 56. The cam track provides the required transition area schedule between the openings necessary for horizontal flight and a vertical flight. In one construction, four connecting means 86 were used spaced around the flow diverter 10.

Each cam track 56 is formed as a curved slot 57 in a rigid member which extends between cicular T-shaped beams 52 and 54. These members are shown as being bolted thereto. The cam roller 116 is rotatably mounted on a shaft 117 which is fixedly connected to its bellcrank 112 between a flange 119 and a nut 121. While one means of affixing a cam roller 116 to its bellcrank 112 has been shown, any means desired can be used.

Annular sealing means 130 and 132 are provided to engage aircraft structure to prevent exhaust from leaking from around the flow diverter 10 before it is directed into a manifold or other receiving means. The sealing means 130 and 132 are of the metallic spring finger type with a resilient sealant between the fingers.

We claim:

1. An engine exhaust diverter including a duct having an open forward end for receiving exhaust and having a closed rearward end, first exit means in said duct for directing exhaust therefrom, second exit means in said duct for directing exhaust therefrom, an annular door mounted on said duct for axial movement to control the flow through one of said exit means, an annular nozzle shroud mounted on said duct for axial movement to control the flow through the other of said exit means, actuating means for moving said annular door and said annular nozzle shroud into one position where said annular door permits flow through its associated exit means and the annular nozzle prevents flow through its associated exit means and a second position where said annular door prevents flow through its associated exit means and the annular nozzle shroud permits flow through its associated exit means.

2. An engine exhaust diverter as set forth in claim 1 wherein said closed rearward end is contoured externally as a nozzle plug, said first exit means being located adjacent said closed end, said annular nozzle shroud being mounted to control the flow through said first exit means, said annular nozzle shroud being shaped to form an annular exhaust nozzle with said contoured nozzle plug when said annular nozzle shroud is positioned to permit flow through its associated first exit means.

3. An engine exhaust diverter as set forth in claim 1 wherein an outer casing is fixed around said duct, an annular space being formed between said second exit means and said outer casing, an exit opening located in said outer casing of said annular space, said annular door being mounted for slidable movement on said outer casing to open and close said exit opening in said outer casing.

4. An engine exhaust diverter as set forth in claim 2 wherein said annular nozzle shroud is mounted for slidable movement between said outer casing and said duct.

5. An engine exhaust diverter as set forth in claim 2 wherein an outer casing is fixed around said duct, an annular space being formed between said second exit means and said outer casing, an exit opening located in said outer casing of said annular space, said annular door being mounted for slidable movement on said outer casing to open and close said exit opening in said outer casing.

6. An engine exhaust diverter as set forth in claim 5 wherein said actuating means comprises a plurality of actuating rod means extending between said duct and said outer casing, said actuating rod means being connected to said annular door and annular nozzle shroud.

7. An engine exhaust diverter as set forth in claim 6 wherein said actuating rod means includes a plurality of first actuating rods extending lengthwise in said annular space adjacent said annular door, means connecting said annular door to said first actuating rod.

8. An engine exhaust diverter as set forth in claim 6 wherein a plurality of second actuating rods are connected by a bellcrank lever means to said annular nozzle shroud, said bellcrank lever means having a bellcrank lever with one end connected to said actuating means and the other end connected to said annular nozzle shroud, the fulcrum of said bellcrank lever being mounted for movement in a cam track fixed to said outer casing.

9. An engine exhaust diverter as set forth in claim 8 wherein track means are located on the inner surface of said outer casing, said annular nozzle shroud having rollers for engaging said track means to confine the movement thereof, said plurality of second actuating rods being connected to a synchronization ring, said synchronization ring being connected to said bellcrank lever means, said synchronization ring having rollers which are also guided in said track means.

* * * * *